Patented May 17, 1949

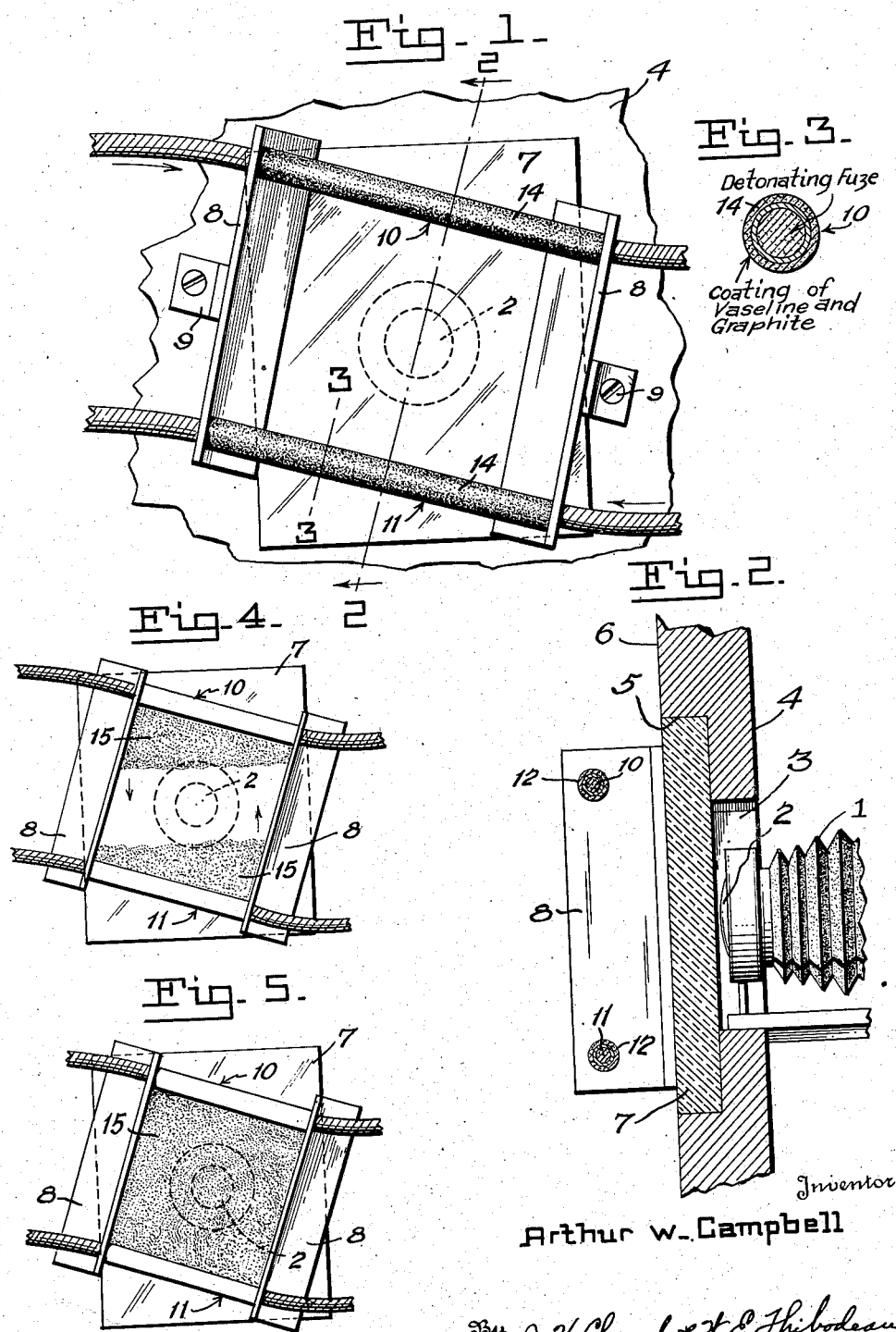

2,470,139

UNITED STATES PATENT OFFICE 2,470,139

CAMERA SHUTTER

Arthur W. Campbell, Wheaton, Ill., assignor to the United States of America as represented by the Secretary of War Application February 8, 1946, Serial No. 646,454

10 Claims. (Cl. 95—11)

This invention relates to a shutter mechanism particularly adapted for use with cameras for taking photographs of detonating explosives and the like.

The principal object of the present invention is the provision of a shutter mechanism having detonating means associated therewith for completely and uniformly eliminating light from the camera lens in timed relation to the detonation of a light source during the photographing of the blast effect of detonating explosives and the like.

A further object is to provide a shutter mechanism consisting of detonating media and a transparent window associated with a camera lens for effectively sealing light from the lens immediately after a photograph of detonating explosive or shell is made.

Still another object is the provision of a relatively simple and inexpensive method and apparatus for effectively sealing light from a camera lens after a photograph of detonating explosives is made.

These and other objects and advantages will be apparent by reference to the accompanying drawings wherein:

Figure 1 is a front elevation of the invention illustrating its position on the inside wall of a dark bomb-proof testing chamber;

Figure 2 is a section taken along line 2—2 of Figure 1;

Figure 3 is an enlarged detail section taken along line 3—3 of Figure 1; and

Figures 4 and 5 illustrate the progressive stages of coating after detonation of the fuses.

Referring more particularly to the drawings, wherein similar reference characters refer to like parts throughout the several views, numeral 1 designates generally a suitable bellows-type camera, only a portion of which is shown. The camera is adapted to be positioned so that the lens 2 thereof is arranged within a suitable aperture 3 formed in a side wall 4 of a dark, bomb-proof, blast explosive testing chamber. The inner end of the aperture 3 is enlarged, as at 5, to form a seat within which is suitably mounted a relatively thick, square-shaped, bulletproof protective window 7 of some suitable transparent material such as glass. The camera is preferably located in a light-tight chamber, not shown, outside the testing chamber so that the photograph is made through the window, as hereinafter described.

A frame consisting of two spaced, parallel, metal angle bars 8 is suitably attached to the inner face 6 of the chamber wall 4 by screws or the like 9. Two parallel, spaced, flexible fabric prima cord detonating fuses 10 and 11 extend through apertures 12 in the angle bars 8 adjacent the ends thereof so that they are spaced slightly from the surface of the glass. The angle bars 8 of the frame are tilted slightly, relative to the vertical axis of the window 7, as shown in Figures 1, 4 and 5, so that the fuses 10 and 11 are arranged and extend angularly across the window just above and below the field of view of the camera. The fuses are tubular in form and contain a filler of some suitable high explosive, such as pentaerythritetetranitrate generally designated as PETN. That portion of the fuses extending between the angle bars 8 is coated with a mixture of Vaseline and graphite 14 for a purpose presently described.

In making flash photographs of detonating shells and explosives by the usual shadow technique, it has been found that either the light intensity or the lens opening must be increased to obtain satisfactory photographs. The increase in the light intensity necessitates the use of an objectionably large quantity of explosive in the flashlight, if the intensity of the light were to be increased without increasing its duration time. On the other hand, the increase in the opening of the lens results in the fogging of the film by luminous post-detonation phenomena. It has thus been discovered that if the shutter could be made to operate quickly enough after the photograph was made, the lens could be opened as wide as desired. Such a shutter has been designed by arranging the prima cord fuses 10 and 11 in the frame and mounting the same on the face of the window 7 above and below the field of view of the camera.

The prima cord fuses are of such length that they are connected to a common firing device, such as an electric detonator, not shown, but suitably located at a point outside the testing chamber, to which the explosive or shell being tested in the chamber and the explosive flash bulb located within the chamber are also connected by lengths of prima cord. Neither the explosive being tested or the flash bulb are shown herein and form no part of the present invention. However, it is to be understood that the explosive being tested is arranged within the testing chamber intermediate the flash bulb and the shutter. Thus, the prima cord fuses 10 and 11 are somewhat longer than the prima cord extending to the explosive but slightly shorter than the cord to the flash bulb so that the detonation of the fuses 10 and 11 will be effected several microseconds after the explosive and at a predetermined point between the respective detonations of the explosive being tested and the flash bulb. By virtue of this arrangement, the products of detonation of the fuses 10 and 11, including Vaseline and graphite, cover the window 7 with a layer or film 15 of soot and carbon and effectively close the window to light.

As the frame holding the fuses is tilted and the detonation along each of the fuses 10 and 11 is initiated from different directions, that is, in the direction of the arrows in Figure 1, the wave of detonation products emanating from each of the fuses will be substantially parallel, as illustrated in Figure 4, and will meet adjacent a central portion of the protective window, as shown in Figure 5, thereby forming a film 15 over the surface of the window and insuring an even and complete cutting off of the light from the camera lens. In other words, as the force of detonation of each fuse progressively decreases as the fuse is detonated, it will be apparent that the rate of combustion of the Vaseline and graphite coating on the respective fuses will correspondingly decrease. Thus, by tilting the fuses and initiating the detonation thereof in different directions, the products of combustion from the fuses will build up and flow in the form of a film towards each other, in the direction of the arrows in Figure 4.

It is to be understood that the detonation of the prima cord fuses 10 and 11 will be simultaneous with the detonation of the prima cord extending to the explosive flash bulb and the explosive being tested. However, the sequence of time of the detonation of the flash bulb, the explosive being tested and the fuses 10 and 11 is regulated by the length of prima cord extending from the common electric firing device to these respective elements. Preferably, the prima cord extending thereto will range in length from a relatively short prima cord to the explosive being tested, to a relatively long cord to the flash bulb. Thus, when the firing device is actuated, the explosive being tested in the dark testing chamber will first be detonated and shortly thereafter in sequence the fuses 10 and 11 and the flash bulb will be detonated so that the detonation of the flash bulb will cause an image of the outline of the blast of the explosive being tested to be picked up by the camera lens.

During the taking of a photograph of an explosive charge, the fuses 10 and 11 detonate, as hereinbefore described, and operate to partially cover the window 7 with a light resisting film of carbon a few microseconds before detonation of the flash bulb, as illustrated in Figure 4. At this point, the products of detonation and combustion from the fuses 10 and 11 will have reached a point just outside the angle of vision of the camera. Due to the previously described timing, the flash bulb will then be detonated and an image of the outline of the blast caused by the detonation of the explosive being photographed will be cast on the camera lens. Simultaneous with the completion of the aforesaid photograph, the products of detonation and combustion from the fuses 10 and 11 will meet adjacent a central portion of the window, as shown in Figure 5, and the window will be completely sealed against light. Thus, it will be readily understood that the camera lens is entirely shut off from any light resulting from any luminous post-detonation phenomena and the film is accordingly protected against fogging or clouding. In other words, the immediate closing of the camera lens by the actuation of the shutter prevents fogging of the film due to light which may be associated with the detonation of the explosive being photographed.

What I claim is:

1. In combination with a camera for taking photographs of detonating explosives and the like in a testing chamber having an opening in a wall thereof, a transparent member covering said opening, means mounting said camera exteriorly of said chamber with its lens directed toward said opening, a frame member mounted on a wall of the chamber adjacent said transparent member, and fuse means arranged on said frame and adapted to be detonated to apply a light resisting coating to said transparent member after a photograph is exposed, said coating consisting of combustion products by the detonation of said fuze means.

2. In combination with a camera for taking photographs of detonating explosives and the like in a testing chamber having an opening in a wall thereof, a transparent window closing said opening, said camera being mounted exteriorly of said chamber, a frame member mounted on a wall of the chamber adjacent said window, said frame member having a pair of substantially parallel explosive fuses arranged thereon for applying, on detonation, a light resisting coating of combustion products to said window after a photograph is exposed.

3. That method of shuttering a camera lens comprising detonating an explosive adjacent one side of a transparent sheet extending over and across said lens to thereby deposit a light-resistant film of combustion products on said sheet.

4. That method of shuttering a camera lens comprising, exposing a photographic film in said camera through a transparent plate positioned over and across said lens, and immediately thereafter igniting an explosive positioned adjacent said plate to thereby directly deposit on said plate, a light-obstructing film of combustion products.

5. That method of shuttering a camera comprising, exposing a film in said camera through a transparent plate extending over and across the exposure opening of said camera, and immediately following said exposure, detonating a length of fuse cord positioned over and adjacent the surface of said plate remote from said camera, to thereby deposit a light-impeding film of combustion products over and across said surface.

6. In a shuttering device for a camera, an opaque wall having an opening, a sheet of transparent material secured over and closing said opening, means adapted to support a camera at one side of said sheet with its lens pointed through said opening, and means adapted to support a pair of parallel fuse cord sections adjacent and parallel to the other side of said sheet, said sections being symmetrically positioned upon opposite sides of the optical axis of said camera and adapted, when detonated, to cover said sheet with a light-obstructing film of combustion products.

7. A shuttering device for a camera, comprising an opaque wall having an opening therein, a transparent plate secured over and closing said opening, a bracket mounted on said wall adjacent said opening, a pair of parallel primacord sections carried by said bracket in parallel relation with each other and said plate, said sections being symmetrically positioned on opposite sides of the central optical axis of said camera, there being a coating comprising a mixture of petroleum jelly and graphite on said sections.

8. The combination with a camera for taking photographs of detonating explosives and the like, of explosive shutter means, transparent protective means interposed between said shutter means and the camera, said shutter means being constructed and arranged to directly coat said protective means with an opaque coating of combustion products by and in response to detonation of said shutter means.

9. In combination with a camera for taking photographs of detonating explosives and the like and including a lens, of shutter means comprising a section of high explosive cord, a transparent protective member interposed between said shutter means and the camera lens, and means associated with said shutter means to automatically and directly apply to said member an opaque coating of combustion products resulting from ignition of said section of explosive cord.

10. In combination with a chamber for testing explosives and having an opening through the wall thereof, a transparent pane secured over said opening to close the same, a camera mounted externally of said chamber with its optical axis directed through said opening, and explosive shutter means mounted adjacent said pane and constructed and arranged to produce combustion products directly covering said pane with an opaque coating in response to detonation of said shutter means.

ARTHUR W. CAMPBELL.

REFERENCES CITED

The following references are of record in the file of this patent:

UNITED STATES PATENTS

| Number | Name | Date |
| --- | --- | --- |
| 1,814,756 | Levy | July 14, 1931 |
| 1,917,245 | Edwards et al. | July 11, 1933 |
| 1,936,595 | Goddard | Nov. 28, 1933 |
| 2,323,301 | Anderson | July 6, 1943 |
| 2,397,009 | Hurley et al. | Mar. 19, 1946 |
| 2,399,476 | Doyle et al. | Apr. 30, 1946 |
| 2,403,730 | MacNeille | July 9, 1946 |